US011178142B2

(12) United States Patent
Li et al.

(10) Patent No.: US 11,178,142 B2
(45) Date of Patent: Nov. 16, 2021

(54) BIOMETRIC DATA SYNCHRONIZATION DEVICES

(71) Applicant: HEWLETT-PACKARD DEVELOPMENT COMPANY, L.P., Spring, TX (US)

(72) Inventors: Ching-Hua Li, Taipei (TW); Yi-Kang Hsieh, Taipei (TW); Chung-Chun Chen, Taipei (TW); Ming-Shien Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 111 days.

(21) Appl. No.: 16/479,290

(22) PCT Filed: Jun. 23, 2017

(86) PCT No.: PCT/US2017/039052
§ 371 (c)(1),
(2) Date: Jul. 19, 2019

(87) PCT Pub. No.: WO2018/236391
PCT Pub. Date: Dec. 27, 2018

(65) Prior Publication Data
US 2020/0120090 A1    Apr. 16, 2020

(51) Int. Cl.
*H04L 29/06* (2006.01)
*G06F 21/45* (2013.01)

(52) U.S. Cl.
CPC .......... *H04L 63/0861* (2013.01); *G06F 21/45* (2013.01)

(58) Field of Classification Search
CPC . H04L 63/0861; H04L 63/0853; G06F 21/45; G06F 21/335; G06F 21/32
See application file for complete search history.

(56) References Cited

U.S. PATENT DOCUMENTS

| | | | |
|---|---|---|---|
| 10,769,635 B2 * | 9/2020 | Lindemann | ........ G06K 9/00604 |
| 10,798,087 B2 * | 10/2020 | Lindemann | ............. H04L 9/006 |
| 2007/0057763 A1 | 3/2007 | Blattner et al. | |
| 2014/0068725 A1 | 3/2014 | Zhang et al. | |
| 2014/0090039 A1 * | 3/2014 | Bhow | ................... H04W 12/06 726/7 |
| 2015/0358315 A1 | 12/2015 | Cronin | |
| 2016/0094550 A1 | 3/2016 | Bradley et al. | |
| 2016/0164849 A1 * | 6/2016 | Smith | ..................... H04L 67/42 713/155 |
| 2017/0004296 A1 | 1/2017 | Toiyama | |
| 2020/0120090 A1 * | 4/2020 | Li | ........................... G06F 21/32 |

OTHER PUBLICATIONS

Remote Biometric Authentication Using Mobile Phones, 2016 < https://security.stackexchange.com/questions/128985/remote-biometric-authentication-using-mobile-phones >.

* cited by examiner

*Primary Examiner* — Matthew Smithers
*Assistant Examiner* — Mirza Israr Javed
(74) *Attorney, Agent, or Firm* — Fabian VanCott

(57) ABSTRACT

A computing system may, in an example, include a first computing device that includes at least one biometric data sensor and a biometric synchronization module on the first computing device to, when executed by a processor, synchronize biometric data from the first computing device to a second computing device in response to a biometric registration request.

19 Claims, 4 Drawing Sheets

BIOMETRIC DATA SYNCHRONIZATION DEVICES

BACKGROUND

Various types of computing devices exist that implement various types of security in order to prevent unauthorized access to data stored thereon or functionality provided by the computing device. Passwords may be used to gain access to the computing device with the owner or those authorized to access the computing device having knowledge of the password information.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
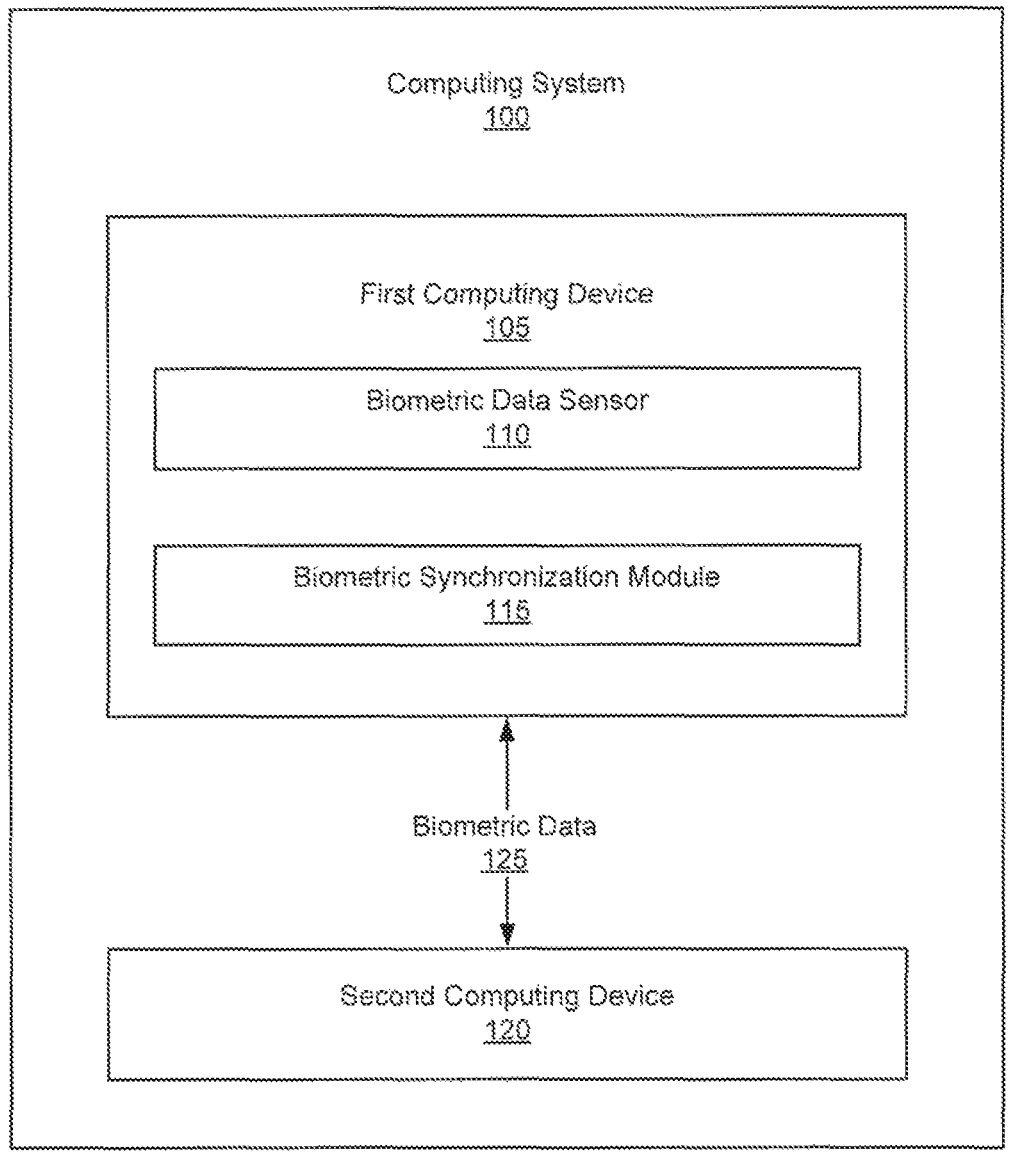
FIG. 1 is a diagram of a computing system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As mentioned above, passwords may be used to gain access to a computing device by those presented with the password and actually authorized to gain access to the computing device. However, passwords have proven difficult in their use due to, in part, an authorized person forgetting the password. However, the importance of maintaining data security with regards to sensitive data such as medical records, bank records and the like has not decreased. Indeed, with the proliferation of this sensitive data on computing devices, the importance of protecting this data has increased.

To better protect this sensitive data, some computing devices implement biometric data sensors that detect the biometric data of a user and deny or provide access to the computing device based on the sensed biometric data. Examples of these biometric data sensors include fingerprint sensors, face recognition cameras, retinal scanners, among others.

Even though some of these computing devices include these biometric data sensors, not all computing devices include such hardware. Indeed, some computing devices may not warrant the use of biometric data sensors and instead forego their implementation based on the costs involved with implementing the biometric data sensors or the physical dimensions of the computing devices themselves limiting their use.

The present specification describes a computing system that includes a first computing device comprising at least one biometric data sensor and a biometric synchronization module on the first computing device to, when executed by a processor, synchronize biometric data from the first computing device to a second computing device in response to a biometric registration request.

The present specification further describes a computing device that includes at least one biometric sensor and a token generation module to generate, at least, access tokens to be sent to a receiving computing device after a determination that biometric data has been synchronized between the computing device and the receiving computing device.

The present specification further describes a method of synchronizing biometric data that includes at a first computing device, receiving a request to unlock a second computing device using biometric data and at the first computing device, sending a biometric synchronization request to the second computing device to synchronize biometric data from the first computing device to the second computing device.

As used in the present specification and in the appended claims, the term "biometric data" or "biometric patterns" are meant to be understood as patterns and data describing the physical characteristics of a user of a computing device. The biometric data or biometric patterns are obtained when a user interfaces with a biometric data sensor.

Additionally, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a diagram of a computing system according to an example of the principles described herein. The computing system (100) may include a first computing device (105) and a second computing device (120); the second computing device (120) being selectively communicatively coupled to the first computing device (105). The first computing device (105) and second computing device (120) may be communicatively coupled to each other via a cable, wireless such as via a Wi-Fi connection or a Bluetooth connection, near-field communication, among others. The first computing device (105) and second computing device (120) may be an electronic device that includes, at least, a processor. Examples of electronic devices include servers, desktop computers, laptop computers, personal digital assistants (PDAs), mobile devices, smartphones, gaming systems, and tablets, among other electronic devices.

The first computing device (105) may include any number of biometric data sensors (110). The biometric data sensors (110) may be capable of detecting a user's physical characteristics and comparing those characteristics to a database of characteristics. Once detected and/or stored, the user's characteristics may be referred to as biometric data. When the user's scanned characteristics match those characteristics maintained in the database, access and/or control of the first computing device (105) is granted. When the user's scanned characteristics do not match any characteristics maintained in the database, access and/or control of the first computing device (105) is not granted.

User characteristics may include fingerprints, palm veins, retinal details, facial features, deoxyribonucleic acid (DNA) sequence, palm print, hand geometry, iris details voice pattern, gait, odor or scent, among other characteristics. These user characteristics may be defined herein as biometric data. Thus, the biometric data sensor (110) may be any sensor that can detect these user characteristics and compare those characteristics to a database of characteristics. By way of example, the biometric data sensor (110) may be a fingerprint scanner, a palm scanner, a retinal scanner, a facial recognition device, a hand scanner, an iris scanner, a voice analyzer, a DNA sequencer, a camera or any other device that can detect the user characteristics described herein. For simplicity of description, the biometric data sensor (110) will be referred to as a fingerprint scanner when specific examples are presented. The use of this example is not meant to be understood a limiting the present description and, instead, the present description contemplates any type of biometric data sensor (110) to detect any type of user characteristic described herein and store the biometric data describing those user characteristics.

The first computing device (105) and second computing device (120) may each include various hardware components. Among these hardware components may be a number of processors, a number of data storage devices, a number of peripheral device adapters, and a number of network adapters. These hardware components may be interconnected through the use of a number of busses and/or network connections. In one example, the processor, data storage device, peripheral device adapters, and network adapter may be communicatively coupled via a bus.

The processor may include the hardware architecture to retrieve executable code from the data storage device and execute the executable code. The executable code may, when executed by the processor, cause the processor to implement at least the functionality of, at the first computing device (105), receive a request to unlock the second computing device (120) using biometric data and, at the first computing device (105), send a biometric synchronization request to the second computing device (120) to synchronize biometric data from the first computing device (105) to the second computing device (120), according to the methods of the present specification described herein. In the course of executing code, the processor may receive input from and provide output to a number of the remaining hardware units.

The data storage device may store data such as executable program code that is executed by the processor or other processing device as well as user-specific biometric data describing the characteristics of the user as described herein. Further, the data storage device may specifically store computer code representing a number of applications that the processor executes to implement at least the functionality described herein. The data storage device (102) may include various types of memory modules, including volatile and nonvolatile memory. For example, the data storage device (102) of the examples described herein includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor may boot from Read Only Memory (ROM), maintain nonvolatile storage in the Hard Disk Drive (HDD) memory, and execute program code stored in Random Access Memory (RAM). Generally, the data storage device (102) may comprise a computer readable medium, a computer readable storage medium, or a non-transitory computer readable medium, among others. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the first computing device (105) and second computing device (120) enable the processor to interface with various other hardware elements, external and internal to each of the first computing device (105) and second computing device (120). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

At least the first computing device (105) may further include a number of modules used in the implementation of the methods described herein. The various modules within the first computing device (105) may include executable program code that may be executed separately. In this example, the various modules may be stored as separate computer program products. In another example, the various modules within the first computing device (105) may be combined within a number of computer program products; each computer program product comprising a number of the modules.

The first computing device (105) may include a biometric synchronization module (115) to, when executed by the processor, synchronize biometric data between the first computing device (105) that includes at least one biometric data sensor (110) with the second computing device (120) that does not include any biometric data sensor (110). The biometric synchronization module (115) module (110) may receive a request to synchronize the biometric data with the second computing device (120) in order to allow a user to access the functions of the second computing device (120). The first computing device (105) may further include a token generation module to generate, at least, access tokens to be sent to the second computing device (120) after a determination that biometric data has been synchronized between the first computing device (105) and the second computing device (120).

During operation of the computing system (100), the first computing device (105) may determine whether a biometric database of the first computing device (105) and the second computing device (120) is shared. If not, the first computing device (105) may send a request to the second computing device (120) inquiring whether the second computing device (120) has a biometric database analyzer consistent with the biometric data sensor (110) of the first computing device (105). As an example, the first computing device (105), having a fingerprint sensor, may send a request to the second computing device (120) inquiring whether the second computing device (120) has a fingerprint database analyzer that can analyze fingerprint data. Upon a determination that the second computing device (120) does not comprise a fingerprint data analyzer, the process stops and notice is given to the user that the second computing device (120) cannot analyze the fingerprint data.

When it has been determined that the first computing device (105) and the second computing device (120) share the same biometric data in their respective biometric databases, a successful scan of a user's biometric data using the biometric data sensor (110) of the first computing device (105) will cause an unlock token to be sent to the second computing device (120). When the second computing device (120) receives the unlock token, the second computing device (120) may be unlocked thereby providing access to the second computing device (120) to the user.

As a consequence of the operation of the first computing device (105) as described herein, a computing device not having a biometric data sensor (110) such as the second computing device (120) may be unlocked using the hardware devices such as the biometric data sensors (110) of the first computing device (105). This alleviates a user from memorizing a password in order to gain access to the second computing device (120) and instead using the user's own physical characteristics to access the second computing device (120). As the user initiates the process as described herein, the second computing device (120) may maintain the biometric data received from the first computing device (105) in a biometric database on the second computing device (120). This allows a user to consistently send an unlock token to the second computing device (120) whenever the user attempts to gain access to the second computing device (120). Other user's biometric data may also be maintained in the biometric database of the second computing device (120) so as to allow multiple first computing devices (105) to provide access to the second computing device (120). Further, with the use of biometric data, the process used to access both the first computing device (105) and second computing device (120) may be relatively more secure because a password is not used to complete the unlocking process of either the first computing device (105) and second computing device (120).

Figure 2:
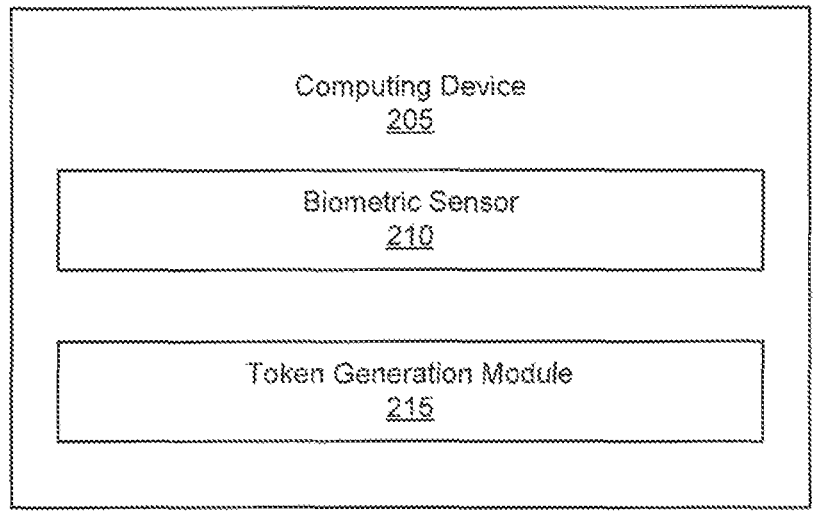
FIG. 2 is a block diagram of a computing device according to an example of the principles described herein.

FIG. 2 is a block diagram of a computing device (205) according to an example of the principles described herein. The computing device (205) may include a biometric sensor (210) similar to the biometric data sensor (FIG. 1, 110) described above in connection with FIG. 1. The biometric sensor (210) may detect the user characteristics and maintain biometric data in a biometric database as described herein.

The computing device (205) may further include a token generation module (215). The token generation module (215) may generate an unlock token after receipt of an indication at the computing device (205) that biometric data has been authorized at the biometric sensor (210). The token may include computer readable instructions indicating to a receiving computing device that the user is authorized to access the receiving computing device and provide such access. In an example, the token provided by the token generation module (215) may be encrypted providing additional security in the transaction between the computing device and receiving computing device.

Figure 3:
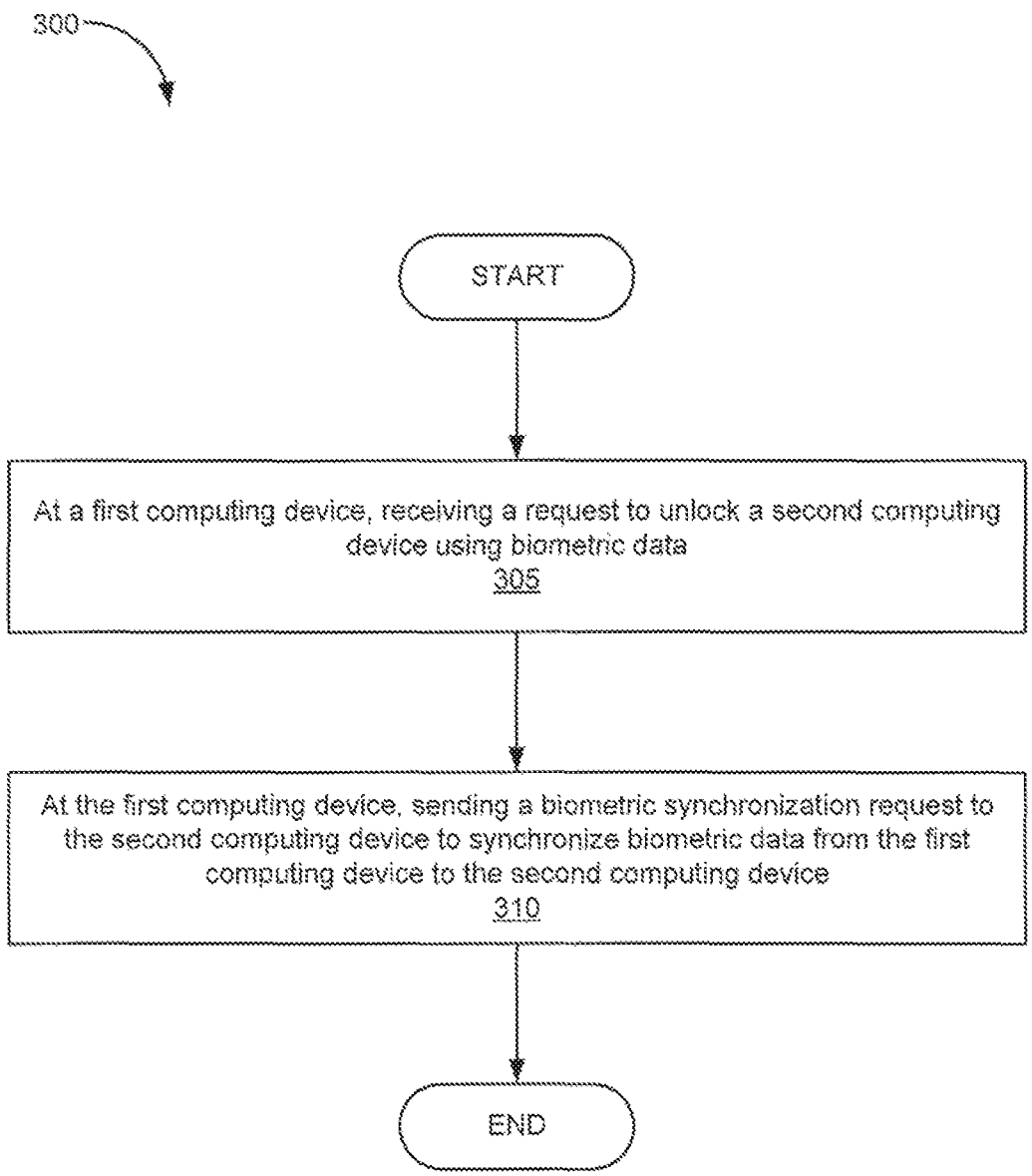
FIG. 3 is a flowchart showing a method of synchronizing biometric data according to an example of the principles described herein.

FIG. 3 is a flowchart showing a method (300) of synchronizing biometric data according to an example of the principles described herein. The method (300) may begin with, at a first computing device, receiving (305) a request to unlock a second computing device using biometric data. The request may be initiated by a user of the first computing device (FIG. 1, 105) when attempting to access a second computing device (FIG. 1, 120).

After the request has been received (305) by the first computing device (FIG. 1, 105), the first computing device (FIG. 1, 105) may send (310) a biometric synchronization request to the second computing device (FIG. 1, 120) to synchronize biometric data from the first computing device (FIG. 1, 105) to the second computing device (FIG. 1, 120). Again, the synchronization of the biometric data between the first and second computing devices (FIG. 1, 105, 120) may either cause the first computing device (FIG. 1, 105) to send biometric data to the second computing device (FIG. 1, 120) or begin an authentication process using the biometric data sensor (FIG. 1, 110) so as to initiate the sending of an access token to the second computing device (FIG. 1, 120).

Figure 4:
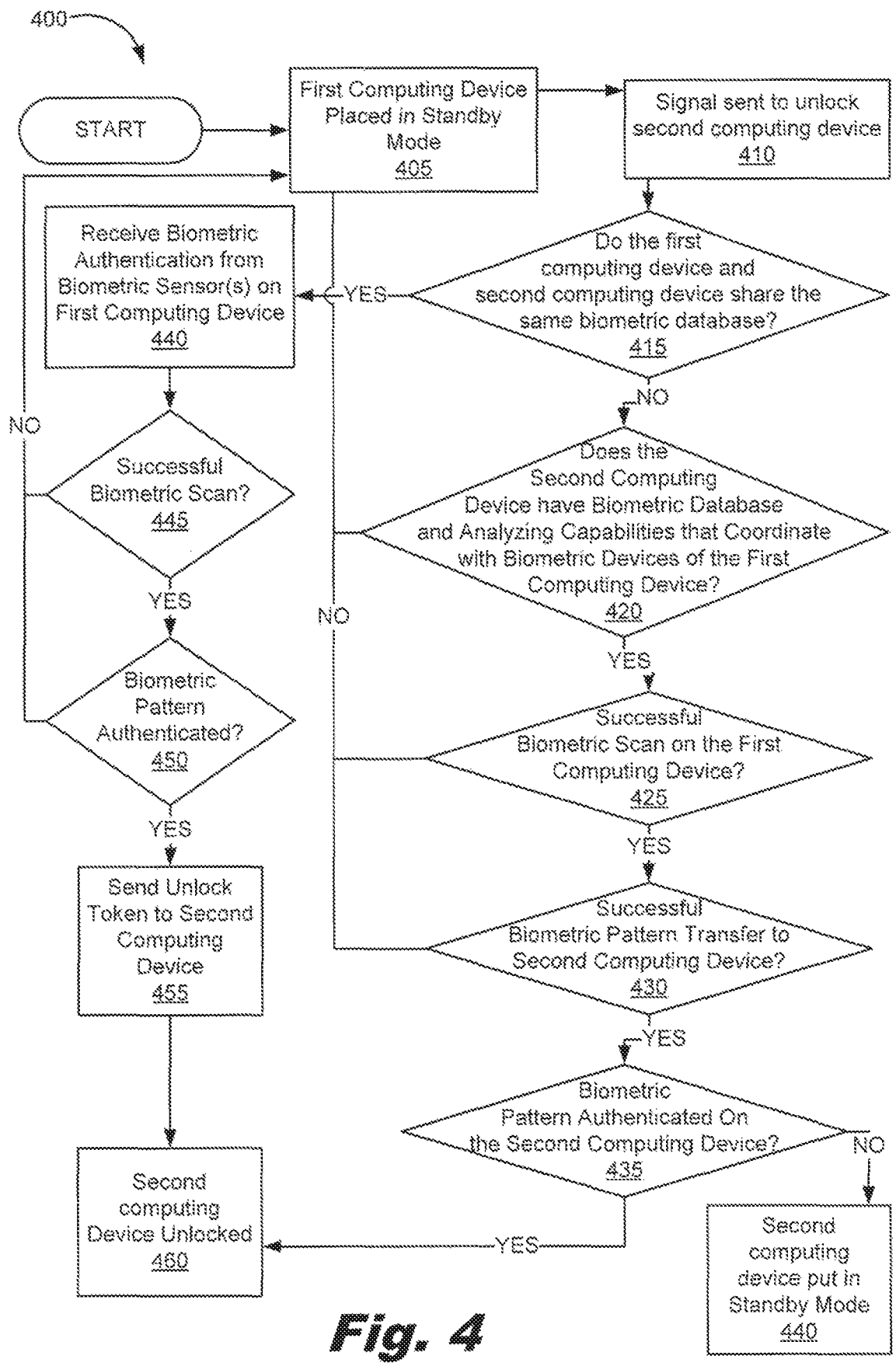
FIG. 4 is a flowchart showing a method of synchronizing biometric data according to an example of the principles described herein.

FIG. 4 is a flowchart showing a method (400) of synchronizing biometric data according to an example of the principles described herein. The method (400) may begin with the first computing device (FIG. 1, 105) being placed (405) in a standby mode. This standby mode may include any mode that places the first computing device (FIG. 1, 105) in a state of accepting input from a user after any number of input actions.

The method (400) may continue with a signal being sent (410) to unlock the second computing device (FIG. 1, 120). The signal may be sent (410) to the second computing device (FIG. 1, 120) after input from a user on the first computing device (FIG. 1, 105) initiates an unlock process for the second computing device (FIG. 1, 120). Certain graphical user interfaces may be presented to the user on the first computing device (FIG. 1, 105) in order to cause the signal to be sent (410) to the second computing device (FIG. 1, 120).

The method (400) then continues by determining (415) if the first computing device (FIG. 1, 105) and second computing device (FIG. 1, 120) share the same biometric database. The biometric database of the first computing device (FIG. 1, 105) may include any biometric data received from the biometric data sensors (FIG. 1, 110) of the first computing device (FIG. 1, 105). In an example, the second computing device (FIG. 1, 120) may not include the same biometric data or even have access to the same biometric database as that found in the first computing device (FIG. 1, 105). When this is the case (Decision No, 415), a determination (420) may be made as to whether the second computing device (FIG. 1, 120) has any biometric analyzing capabilities and biometric database data so that matching of any biometric data may be completed by the second computing device (FIG. 1, 120). If not, the process may return to placing the first computing device (FIG. 1, 105) in a standby node and/or notifying a user, via the graphical user interface of the first computing device (FIG. 1, 105), that the second computing device (FIG. 1, 120) cannot be unlocked due to the lack of authentication. In an example, the second computing device (FIG. 1, 120) may be provided with access to a biometric database and a biometric data analyzer may be installed on the second computing device (FIG. 1, 120) in order to allow access to the second computing device (FIG. 1, 120) in a later process.

When it has been determined (Decision YES, 420) that the second computing device (FIG. 1, 120) maintains a biometric database and can analyze that biometric data sent to it from the first computing device (FIG. 1, 105), it is then determined (425) if a biometric scan using the biometric data sensors (FIG. 1, 110) on the first computing device (FIG. 1, 105) are successful. If not (Determination No, 425), the process continues with the first computing device (FIG.

1, 105) notifying the user of an unsuccessful biometric scan and places (405) the first computing device (FIG. 1, 105) in a standby mode. If it has been determined (Determination YES, 425) that the biometric scan was successful, it is then determined (425) whether the biometric pattern obtained by the biometric data sensors (FIG. 1, 110) of the first computing device (FIG. 1, 105) have been successfully transferred to the second computing device (FIG. 1, 120). If not, (Determination No, 430), the process continues with the first computing device (FIG. 1, 105) notifying the user of an unsuccessful biometric scan and places (405) the first computing device (FIG. 1, 105) in a standby mode.

If it is determined (425) that the biometric pattern obtained by the biometric data sensors (FIG. 1, 110) of the first computing device (FIG. 1, 105) have been successfully transferred to the second computing device (FIG. 1, 120), the second computing device (FIG. 1, 120) then determines (435) whether the biometric patterns are authentic. If it is determined (Determination No, 435) that the biometric patterns received by the first computing device (FIG. 1, 105) are not authentic, the second computing device (FIG. 1, 120) is maintained in a standby mode and access to the second computing device (FIG. 1, 120) is not granted. However, if it is determined (Determination No, 435) that the biometric patterns received by the first computing device (FIG. 1, 105) are authentic, the second computing device (FIG. 1, 120) is unlocked (460).

If it has been determined (Determination YES, 415) that the first computing device (FIG. 1, 105) and second computing device (FIG. 1, 120) share the same biometric database, the first computing device (FIG. 1, 105) may receive (440) biometric authentication from the biometric data sensors (FIG. 1, 110) on the first computing device (FIG. 1, 105), make a determination (Determination YES. 445) that the biometric scan was successful and authenticated (Determination YES, 450) and then send (455) an unlock token to the second computing device (FIG. 1, 120) instructing the second computing device (FIG. 1, 120) to be unlocked (460). With this method (400) a user may unlock the second computing device (FIG. 1, 120) using the biometric data sensors (FIG. 1, 110) of the first computing device (FIG. 1, 105) even where the second computing device (FIG. 1, 120) does not include biometric data sensors (FIG. 1, 110) of its own. In an example, even where the second computing device (FIG. 1, 120) includes its own biometric data sensors (FIG. 1, 110), the first computing device (FIG. 1, 105) may implement this method (400) in order to unlock the second computing device (FIG. 1, 120). Still further, in an example where the second computing device (FIG. 1, 120) includes biometric data sensors (FIG. 1, 110), the second computing device (FIG. 1, 120) may be used to unlock the first computing device (FIG. 1, 105) per the method (400) described herein.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, the first computing device (FIG. 1, 105), second computing device (FIG. 1, 120), or other programmable data processing apparatus to produce a machine, such that the computer usable program code, when executed via, for example, the processor of either the first computing device (FIG. 1, 105), second computing device (FIG. 1, 120), or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Although the system and methods describe the unlocking of the second computing device (FIG. 1, 120) using the biometric data sensors (FIG. 1, 110) of the first computing device (FIG. 1, 105), other functions of the second computing device (FIG. 1, 120) may be triggered as well. Some examples of these functions of the second computing device (FIG. 1, 120) that may be accessed via the methods described herein may include a data backup process, a voice command function, a camera function, an email function, among others. As an example, the second computing device (FIG. 1, 120) may be an Internet of Things (IoT)-type device that servers a special function such as cooking, heating, cooling, light augmentation in a home, security, among others. Thus, the functionality of these IoT-type devices may be accessed using the biometric data sensors (FIG. 1, 110) of the first computing device (FIG. 1, 105) as described herein.

The specification and figures describe a system and method to be used in order to unlock a second computing device using the biometric data sensors of a first computing device. Authentication of any biometric data or patterns obtained via the biometric data sensors of the first computing device may be accomplished on either the first computing device or second computing device. A determination as to which of the first or second computing devices completes the biometric data authentication process may depend on whether biometric data is maintained on the second computing device and whether the second computing device includes biometric data analyzing software. Where the first computing device authenticates biometric data obtained from a biometric data sensor, a token may be sent to the second computing device which then authenticates the token and unlocks the second computing device. Specific token reception software presented in the form of computer usable program code may be maintained on the second computing device so as be able to receive the token and provide access to the second computing device as described herein.

This system and method effectively extends the capabilities of those computing devices that do not include biometric data sensors. The capabilities are extended by allowing for the biometric data sensors of another computing device to achieve relatively higher security. Further, user experience may be achieved if and when the user of the second computing device forgets unlocking passwords to the second computing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing system, comprising:
a first computing device comprising at least one biometric data sensor;
a biometric synchronization module on the first computing device to, when executed by a processor, synchronize biometric data from the first computing device to a second computing device in response to a biometric synchronization request, wherein the first and second computing devices to maintain separate biometric databases, and wherein the biometric synchronization module is to determine that the first computing device and the second computing device share the same biometric data in their respective biometric databases in response to the biometric synchronization request; and a token generation module to generate an unlock token to be sent to the second computing device in response to the determination that the first computing device and the second computing device share the same biometric data in their respective biometric databases.

2. The computing system of claim 1, wherein the first computing device receives a request to gain access to the second computing device using biometric data obtained via the biometric data sensor.

3. The computing system of claim 2, wherein the first computing device determines whether the first and second computing device have synchronized biometric data.

4. The computing system of claim 3, wherein the first computing device sends updated biometric data sensor specific biometric data to the second computing devices when it is determined that the first and second computing device do not have synchronized biometric data.

5. The computing system of claim 4, wherein the first computing device sends a request for the second computing device to review a biometric scan initiated at the first computing device, compare the scan with the updated biometric data from the first computing device in order to determine whether access to the second computing device should be granted.

6. The computing system of claim 3, wherein the first computing device sends the unlock token to the second computing device when is it determined that the first and second computing device do have synchronized biometric data and after the first computing device has determined that a successful biometric scan has been completed using the biometric data sensor on the first computing device.

7. The computing system of claim 3, wherein the first computing device sends a request to enable a voice command detection function to the second computing device when is it determined that the first and second computing device do have synchronized biometric data and after the first computing device has determined that a successful biometric scan has been completed using the biometric data sensor on the first computing device.

8. The computing system of claim 1, wherein the second computing device does not include a biometric data sensor.

9. The computing system of claim 1, wherein the biometric data synchronized from the first computing device to the second computing device comprises data describing physical characteristics of a user.

10. The computing system of claim 1, wherein the first computing device to send the unlock token to the second computing device in response to a successful scan of biometric data by the biometric data sensor and the determination that the first computing device and the second computing device share the same biometric data in their respective biometric databases.

11. The computing system of claim 1, wherein the first computing device is to send biometric data obtained by the biometric data sensor to the second computing device.

12. The computing system of claim 11, wherein the second computing device is to add the biometric data received from the first computing device to the biometric database of the second computing device.

13. The computing system of claim 1, wherein the first computing device to:
initiate a request to unlock the second computing device using the at least one biometric data sensor; and
send the biometric synchronization request to the second computing device in response to the request to unlock the second computing device.

14. A computing device, comprising:
at least one biometric sensor;
a biometric synchronization module to determine that biometric data has been synchronized between a biometric database of the computing device and a biometric database of a receiving computing device; and
a token generation module to generate, at least, access tokens to be sent to the receiving computing device after the determination that biometric data has been synchronized between the biometric database of the computing device and the biometric database of the receiving computing device.

15. The computing device of claim 14, wherein the access tokens include:
an access token granting access to a voice recognition function on the receiving computing device;
an access token granting access to back up data from the computing device or maintained on the receiving computing device;
an access token granting access to a camera device on the receiving computing device, an access token granting access to executable computer usable program code maintained on the receiving computing device;
or combinations thereof.

16. The computing device of claim 14, wherein the biometric database of the computing device to maintain biometric data for a number of users authorized to access at least the computing device.

17. A method of synchronizing biometric data, comprising:
at a first computing device, receiving a request to unlock a second computing device using biometric data;
at the first computing device, sending a biometric synchronization request to the second computing device to synchronize biometric data from the first computing device to the second computing device, wherein the first and second computing devices to maintain separate biometric databases;
at the first computing device, determining that the first computing device and the second computing device share the same biometric data in their respective biometric databases in response to the biometric synchronization request; and
at the first computing device, sending an unlock token to unlock the second computing device in response to the determination that the first computing device and the second computing device share the same biometric data in their respective biometric databases.

18. The method of synchronizing biometric data of claim 17, further comprising sending an access token to the second computing device upon, at least, a determination that the biometric data has been synchronized between the first and second computing device.

19. The method of synchronizing biometric data of claim 17, further comprising sending an access token to the second computing device upon, at least, a request at the first computing device to access functionality of the second computing device.

* * * * *